July 10, 1951 B. L. ELLE ET AL 2,559,858
MICROCARD HOLDER FOR VIEWERS
Filed Feb. 17, 1949
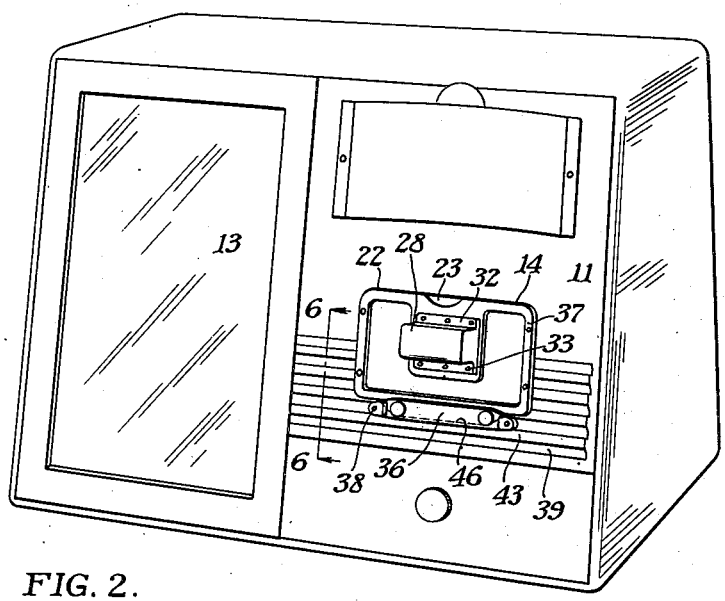
FIG. 1.
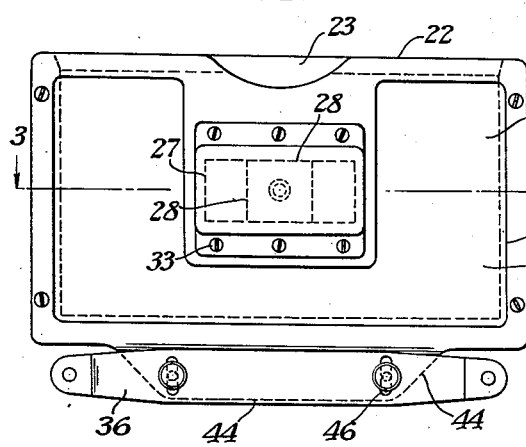
FIG. 2.
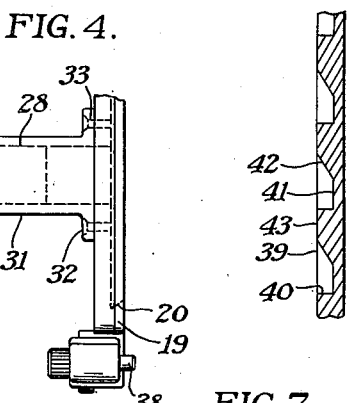
FIG. 4.
FIG. 6.
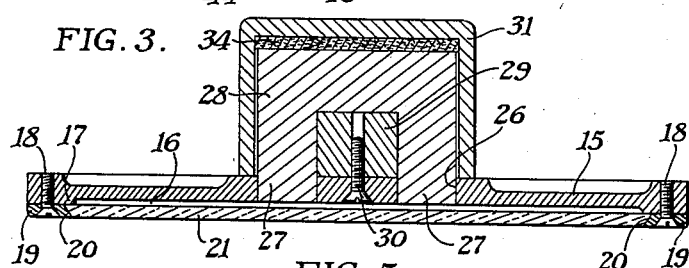
FIG. 3.
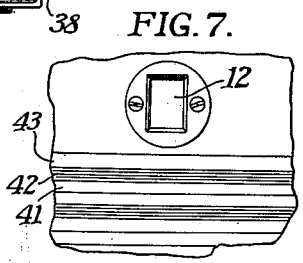
FIG. 7.
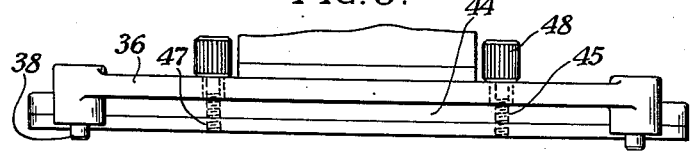
FIG. 5.
BRUCE L. ELLE
JOHN C. HAELEN
INVENTORS
BY
ATTORNEYS

Patented July 10, 1951

2,559,858

UNITED STATES PATENT OFFICE 2,559,858

MICROCARD HOLDER FOR VIEWERS

Bruce L. Elle and John C. Haelen, Rochester, N. Y., assignors to Eastman Kodak Company, Rochester, N. Y., a corporation of New Jersey Application February 17, 1949, Serial No. 76,866

6 Claims. (Cl. 88—28)

The present invention relates to a projection viewer, and more particularly to a holder therefor for receiving and positioning a card which bears a plurality of micro images.

It is now common practice to photograph pages of a book, newspaper or similar articles to form micro images thereof which may be arranged in proper sequence in rows on a film or card. The film or card bearing these micro images may then be positioned on a projection viewer to bring the images successively into registration with an illuminated projection aperture to project magnified images of the pages or images on to a screen or suitable viewing surface. The card bearing these micro images may be designated as a microcard.

The present invention pertains to a microcard holder for use in a projection viewer which utilizes magnetic attraction between the holder and a ferrous or magnetizable reference plane or wall of the projector to position the microcard in registry with the illuminated projection aperture and with the focal plane of the projection lens. The arrangement permits scanning of all the images on the card and positive positioning of the card to enable any individual image to be read. In order to insure proper positioning of the holder on the wall or reference plane, the holder carries a magnet of the permanent type which serves to retain the holder and its associated image-bearing card on the wall, yet permits free and easy movement of the holder thereon to bring the proper image into projecting position.

The reference plane or wall on which the card holder is movably positioned is provided with a series of milled grooves which are adapted to receive guiding and positioning pins carried by the holder to position the holder in proper relation to the projection aperture to bring the desired row of images into alignment with the aperture. Adjusting means is provided on the holder so as to orient the card images with the projection aperture.

The present invention has as its principal object the provision of a new and improved card holder for microcard readers or viewers.

Still another object of the invention is the provision of an arrangement for securely yet detachably retaining the holder in position on the viewer while permitting complete freedom of movement to afford complete scanning of the plurality of images on the card.

Yet another object of the invention is the provision of means for positioning the holder accurately on the viewer to bring the rows of images into proper relation with the projection aperture.

And another object of the invention is the provision of an adjustment on the holder to permit proper orientation of the card images with relation to the projection aperture of the viewer.

A still further object of the invention is the provision of a card holder of the class described which is simple in construction, formed of few parts of rugged construction, easy to operate and highly effective in use.

To these and other ends, the invention resides in certain improvements and combinations of parts, all as will be hereinafter more fully described, the novel features being pointed out in the claims at the end of the specification.

In the drawings:

Fig. 1 is a perspective view of one form of a projection viewer, showing the relation thereto of a microcard holder constructed in accordance with the present invention;

Fig. 2 is a front view of the microcard holder of the present invention, showing the relation of the holding magnet thereto;

Fig. 3 is a horizontal sectional view taken substantially on line 3—3 of Fig. 2, showing the relation of the card-receiving slot and the holding magnet;

Fig. 4 is a side view of the holder illustrated in Fig. 3;

Fig. 5 is a bottom view of the holder shown in Fig. 2, illustrating the means for adjusting the card holder portion on the base to orient the card images relative to the projection aperture of the viewer;

Fig. 6 is a vertical sectional view taken substantially on line 6—6 of Fig. 1 showing the guiding or positioning grooves on the reference plane or front wall of the viewer; and Fig. 7 is a partial front elevation view of the front wall of the viewer housing, showing the relation of the positioning grooves and the projection aperture.

Similar reference numerals throughout the various views indicate the same parts.

The present invention relates to a microcard holder adapted for use with a projection viewer comprising a housing which encloses the illuminating lamp and the various optical members. As the viewer and the optics thereof may be of any suitable design and do not constitute a part of the present invention, details thereof are not illustrated or described. The only essential requirement is that a wall, preferably the front wall 11, of the viewer be formed of a magnetizable material, such as a ferrous metal, and provided with a projection aperture 12, adapted to be illuminated by a light source, not shown, positioned within the viewer housing. If desired, one side of the wall 11 may be apertured to receive a viewing screen 13. The microcard, not shown, may be provided with a plurality of separate and independent micro images which may be arranged in rows on the card. As such a card does not form a part of the present invention, the showing thereof is not deemed necessary.

This microcard is adapted to be positioned in a card holder, generally indicated by the numeral 14, with the images of the card facing the aperture 12 when the holder is positioned, as illustrated in Fig. 1. The holder is in the form of a flat plate 15 having the face thereof recessed, as shown at 16, to provide a marginal flange 17, to which is secured, by screws 18, a strip 19 having beveled inner edges 20 adapted to engage similarly beveled edges of a glass plate 21 which overlies the recess 16, as best shown in Fig. 3. The strip 19 is omitted at the top, see Fig. 2, to permit the placing of the microcard in the recess 16 between the plate 15 and the glass 21. The latter serves to hold the card flat to prevent buckling thereof due to the heat of the illuminating means. The top edge 22 of the plate may be cut away at the center, as shown at 23, to facilitate insertion of the card in and removal from the recess 16, as llustrated in Fig. 2.

The plate 15 is formed with a pair of spaced openings 26 through which the pole pieces 27 of a U-shaped permanent magnet 28 project, as best shown in Fig. 3. A lug 29 extends upwardly between the pole pieces 27 and is held in place by a screw 30 which extends through the plate 15 and into a registering threaded hole in the lug 29. In order to retain the magnet in place, a hollow cover overlies the magnet and is provided with laterally-extending flanges 32 which are held in place on the plate 15 by screws 33, see Figs. 1 and 2. The cover 31 cooperates with the lug 29 to hold the magnet 28 in place, as is apparent from an inspection of Fig. 3. If desired, a layer of felt 34, or other suitable material, may be placed between the magnet and the cover to take up any possible looseness or play so that the magnet will be retained securely in position, as shown in Fig. 3. Thus, the magnet is retained in position such that the ends of the pole pieces are substantially flush with the front face of the plate 15 but do not extend into the recess 16 to prevent or interfere with the insertion of the card therein, as will be clear from an inspection of Fig. 3.

If desired, the card holder 14 may be made of a single member, but for reasons to be later more fully described, the holder is formed of two parts comprising of lower base member 36 and an upper card portion 37 adjustably connected to the base in a manner and for a purpose to be later pointed out. The base 36 is provided with a pair of protruding guide pins 38 adapted to ride in grooves, generally indicated by the numeral 39, formed on the front wall 11 below the aperture 12 thereof, as shown in Figs. 1 and 7. These grooves are vertically spaced to correspond with the spacing of the rows of images on the card so that when the pins are in any one groove, a row of images will be in horizontal alignment with the aperture 12 and by moving the card horizontally, the images in the row may be brought successively into projecting position into registry with the aperture. The number of such grooves corresponds with the number of rows of images on the card. On moving the pins 38 to different grooves, different rows of images may be brought into horizontal alignment with the projection aperture, as is deemed apparent. The grooves are of the shape best shown in Fig. 6 to provide a bottom 40 on which the pins 38 move to guide the holder and hence the card during its horizontal movement to bring successive images in any one row into registration with the aperture 12. When a different row of images is to be scanned, the holder is moved vertically to position the pins 38 in a different groove; the direction of movement of the holder depends, of course, on the particular row to be scanned. Each groove is formed with a straight back wall 41 extending upwardly from the bottom 40 and terminating in an outwardly inclined wall 42, as clearly shown in Fig. 6.

The holder 14 with its microcard is positioned on the wall 11 with the positioning or guide pins 38 arranged in the proper groove and resting on the bottom 40 thereof. In order that the holder may be held securely yet releasably, the front wall 11 is made of a magnetizable material such as a ferrous metal so as to retain the holder in place by magnetic attraction.

Thus, the magnet 28 will serve to retain the holder in any position of adjustment, yet will permit freedom of movement of the holder on the wall to slide the pins 38 along the grooves 39 to bring the images of one row into successive registration with the aperture. When another row of images is to be viewed, the holder is moved vertically to bring the pins 38 into the proper groove. If the holder is to be moved upwardly, the holder may merely be grasped by the cover 31, which acts as a handle, and moved upwardly. During such movement pins 38 slide upwardly along the back wall 41 and then forwardly along the inclined wall 42, the holder pivoting about its upper edge. Further movement will cause the pins to slide along the surface 43 between the grooves until the pins 38 register with the next groove, whereupon the pins will move inwardly to rest on the bottom of the next groove. During the changing of grooves, the magnet retains the holder against the wall 11. If the holder is to be moved downwardly, the cover is grasped and the holder is tilted about its upper edge to draw the pins 38 out of the registering groove. The holder is then slid downwardly along the wall until the pins register with the proper groove. Thus, the holder may be readily and easily moved to cooperate with the proper groove to bring the desired rows of images into horizontal alignment with the aperture 12 so that the images of the row may be scanned by sliding the holder horizontally, the pins 38 sliding along the bottom 40 of the groove to retain the horizontal position of the holder.

In the manufacture of microcards, the rows of image areas are normally accurately spaced. However, due to variation in card sizes, it is often found that the bottom row of images is not spaced the proper distance from the bottom edge of the card. It is obvious, therefore, that if such a card is placed in the holder, the rows of images will not be in proper horizontal alignment relative to the aperture 12 when the pins 38 are inserted in the grooves 39. In order to compensate for such possible inaccuracies, the present invention provides an arrangement by which the card holder portion 37 may be adjusted relative to the base 36.

To secure this result, the lower part of the portion 37 is provided with a depending flange 44 which overlies the base 36, as best shown in Fig. 2. The portion 37 is detachably connected to the base by means of a pair of screws 45 which pass through enlarged openings 46 in the flange 44 and into registering threaded openings 47 in the base, as best shown in Fig. 5. When the portion 37 is to be adjusted relative to the base, the screws 45 are backed off by gripping and turning the millheads 48 of the screws. The portion 47 may then be adjusted by reason of the enlarged openings 46 which permits slight movement of the portion 37 relative to the screws 45 and base 36. After the portion 37 has been properly adjusted, the screws 45 are tightened to clamp the flange 44 tightly against the base 36 to hold the portion 37 in its adjusted position. By means of this arrangement, adjustment is provided between the holder portion 37 and the base 36 so that any inaccuracies arising due to improper positioning of the rows of images relative to the lower card edge during card manufacture may be overcome to adjust the card to position the rows of image areas in proper horizontal relation with the projection aperture. Thus, the various images of one row may be scanned by sliding the holder horizontally, the pins 38 riding in the grooves 39. When another image row is to be scanned, the holder is moved to position the pins in the proper groove, whereupon the desired row is automatically brought into scanning position.

The present invention thus provides a new and improved card holder for microcards for use in projection viewers. The holder is securely and firmly held in any position of adjustment, yet may be readily and easily moved to bring another image of the row, or an image of another row, into projection position. Also, means is provided for adjusting the holder to compensate for slight inaccuracies in the manufacture of the microcards.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

We claim:

1. The combination with a projection viewer having a wall formed of magnetizable material and provided with an illuminated projection aperture, of a holder adapted to receive a card having rows of micro images positioned thereon, means for positioning said holder on said wall to arrange said images selectively in registry with said aperture, and magnetic means carried by said holder and cooperating with said wall to retain said holder releasably but movably mounted on said wall.

2. The combination with a projection viewer having a wall formed of a magnetizable material and having an illuminated projection aperture, of a holder formed with a recess adapted to receive and hold a card provided with a plurality of micro images, means covering said recess to hold said card flat, means on said wall to position said holder thereon to position selectively an image in registry with said aperture, and a magnet carried by said holder for retaining said holder releasably on said wall.

3. The combination with a projection viewer having a wall formed with an illuminated projection aperture, of a holder adapted to receive a card having rows of micro images positioned thereon, said holder comprising a base and a card-holding portion, means on said wall for guiding said portion to bring said images successively into substantial registry with said apertures, and means for adjusting said portion relative to said base to position said images in registering relation with said aperture.

4. The combination with a projection viewer having a wall formed with an illuminated projection aperture, of a holder adapted to receive a card having rows of micro images positioned thereon, said holder comprising a base and a card-holding portion, said wall being formed with guide grooves formed therein, means on said base engageable in said grooves to arrange said holder movably on said wall to position selectively said images in substantial registry with said aperture, and means for connecting said base adjustable to said portion to permit the latter to be moved relative to said base to bring said images in proper registration with said aperture.

5. The combination with a projection viewer having a wall formed of a magnetizable material and having an illuminated projection aperture, of a holder adapted to receive and hold a card provided with a plurality of micro images, said holder comprising a base and a card-receiving portion, said wall being formed with a group of parallel arranged grooves, positioning pins carried by said base and engageable in said grooves to guide said portion on said wall to bring said images successively into substantial registration with said aperture, means to connect said base adjustable to said portion to permit movement of the latter relative to said base to bring said images into accurate registration with said aperture, and magnetic means carried by said portion and cooperating with said wall to hold said holder releasably thereon.

6. The combination with a projection viewer having a wall formed of a magnetizable material and having an illuminated projection aperture, of a holder adapted to receive and hold a card provided with a plurality of micro images, said holder comprising a base and a card-receiving portion, said wall being formed with a group of parallel arranged grooves, positioning pins carried by said base and engageable in said grooves to guide said portion on said wall to bring said images successively into substantial registration with said aperture, means to connect said base adjustable to said portion to permit movement of the latter relative to said base to bring said images into accurate registration with said aperture, magnetic means carried by said portion and cooperating with said wall to hold said holder releasably thereon, and means for mounting said magnetic means on said portion.

BRUCE L. ELLE.
JOHN C. HAELEN.

REFERENCES CITED

The following references are of record in the file of this patent:

UNITED STATES PATENTS

| Number | Name | Date |
| --- | --- | --- |
| 1,275,496 | Taylor et al. | Aug. 13, 1918 |
| 1,368,880 | Bettini | Feb. 15, 1921 |
| 1,738,054 | Hill | Dec. 3, 1929 |
| 1,749,961 | Stock et al. | Mar. 11, 1930 |
| 1,943,673 | Hudson | Jan. 16, 1934 |
| 2,091,144 | Freill | Aug. 24, 1937 |
| 2,168,503 | Williamson | Aug. 8, 1939 |
| 2,256,178 | Stuart | Sept. 16, 1941 |
| 2,335,697 | Reyniers | Nov. 30, 1943 |
| 2,341,098 | Hansen | Feb. 8, 1944 |
| 2,431,662 | Ralph | Nov. 25, 1947 |